United States Patent
Kim et al.

(10) Patent No.: US 8,229,371 B2
(45) Date of Patent: Jul. 24, 2012

(54) RECEIVING-TRANSMISSION APPARATUS AND METHOD OF SWITCHING TRANSMISSION ANTENNA IN TRANSMISSION SWITCHED DIVERSITY SYSTEM

(75) Inventors: Kyeongpyo Kim, Daejeon (KR); Yong Sun Kim, Suwon-si (KR); Seung Eun Hong, Daejeon (KR); Hyoung Jin Kwon, Chungcheongbuk-do (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 362 days.

(21) Appl. No.: 12/556,950

(22) Filed: Sep. 10, 2009

(65) Prior Publication Data

US 2010/0062732 A1 Mar. 11, 2010

(30) Foreign Application Priority Data

Sep. 10, 2008 (KR) ......................... 10-2008-0089428
Aug. 17, 2009 (KR) ......................... 10-2009-0075656

(51) Int. Cl.
*H03C 7/02* (2006.01)
*H04K 3/00* (2006.01)
(52) U.S. Cl. ......................... 455/101; 455/69
(58) Field of Classification Search ........... 455/69, 455/70, 101, 522
See application file for complete search history.

(56) References Cited

U.S. PATENT DOCUMENTS

| 7,123,887 B2 | 10/2006 | Kim et al. |
| 7,489,652 B2 | 2/2009 | Kwon et al. |
| 7,499,709 B2 * | 3/2009 | Das et al. ............... 455/455 |

FOREIGN PATENT DOCUMENTS

KR 10-2008-0086726 9/2008

* cited by examiner

*Primary Examiner* — Lee Nguyen
(74) *Attorney, Agent, or Firm* — Staas & Halsey LLP

(57) ABSTRACT

Provided are a transmission/receiving apparatus and method of switching a transmission antenna in a Transmission Switched Diversity (TSD) system. The transmission apparatus includes an announcement command frame reading unit to verify a TSD Information Element (IE) included in an announcement command frame when receiving the announcement command frame from a receiving apparatus, and to verify whether to request a switching of the transmission antenna, an antenna switching unit to select an antenna, not being selected from a plurality of antennas, as a transmission antenna when the announcement command frame requests the switching of the transmission antenna, and to switch a currently used antenna into the selected transmission antenna, and an announcement command frame generation unit to convert transmission antenna information included in the TSD IE into the selected transmission antenna, and to generate a response announcement command frame including the converted TSD IE and transmit to the receiving apparatus.

20 Claims, 5 Drawing Sheets

FIG. 2

| bits:b7 | b6 | b5 | b4 | b3 | b2 | b1 | b0 |
|---|---|---|---|---|---|---|---|
| | | | Supported data rates | | | | |

| bits:b15 | b14 | b13 | b12 | b11 | b10 | b9 | b8 |
|---|---|---|---|---|---|---|---|
| Imp-ACK | Dly-ACK | Listen to multicast | Listen to source | Always AWAKE | Preferred fragment size | | |

| bits:b23 | b22 | b21 | b20 | b19 | b18 | b17 | b16 |
|---|---|---|---|---|---|---|---|
| UEP type | | | UEP capable | | Blk-ACK | STP | CTA relinquish |

| bits:b31 | b30 | b29 | b28 | b27 | b26 | b25 | b24 |
|---|---|---|---|---|---|---|---|
| Aggregation support | | HRP TX capable | HRP RX capable | OOK capable | AV capable | HIS capable | SC capable |

| bits:b39 | b38 | b37 | b36 | b35 | b34 | b33 | b32 |
|---|---|---|---|---|---|---|---|
| Reserved | | | TSD support 210 | | Supported IFS | | |

| octets : 1 | 1 | 1 | 1 | 1 | 1 |
|---|---|---|---|---|---|
| Transmit direction index (310) | TSD feedback period (320) | Number of Transmit directions (330) | Mode (340) | Length (350) | Element ID (360) |

300

RECEIVING-TRANSMISSION APPARATUS AND METHOD OF SWITCHING TRANSMISSION ANTENNA IN TRANSMISSION SWITCHED DIVERSITY SYSTEM

CROSS-REFERENCE TO RELATED APPLICATION

This application claims the priority benefit of Korean Patent Application Nos. 10-2008-0089428 filed on Sep. 10, 2008, and 10-2009-0075656 filed on Aug. 17, 2009 in the Korean Intellectual Property Office, the disclosure of which is incorporated herein by reference.

BACKGROUND

1. Field of the Invention

Exemplary embodiments relate to a transmission/receiving apparatus and method of switching a transmission antenna in a Transmission Switched Diversity (TSD) system, and more particularly, to a transmission/receiving apparatus and method that may select a transmission antenna from among a plurality of antennas of a transmission apparatus according to a request of a switching of a transmission antenna of a receiving apparatus in the TSD system, and switch a currently used antenna into the selected transmission antenna.

2. Description of the Related Art

In an application field such as a Wireless Personal Area Network (WPAN) requiring a high data rate, a Multi Input Multi Output (MIMO) technique may be necessary. However, a system including a plurality of antennas and a plurality of Radio Frequency (RF) channels may require a high priced chip and a high complexity of hardware due to the same number of the plurality of antennas and RF channels. This system may not be suitable for the application field such as WPAN requiring a relatively low cost and a relatively low power although obtaining an optimal performance. Accordingly, there is a need for a scheme of selecting an antenna that may be suitable in a system including a plurality of antennas and RF channels. In this instance, a number of the plurality of RF channels may be less than a number of the plurality of antennas.

SUMMARY

An aspect of the present invention provides a transmission/receiving apparatus and method of switching a transmission antenna in a Transmission Switched Diversity (TSD) system.

Another aspect of the present invention also provides a transmission/receiving apparatus and method that may select a transmission antenna from among a plurality of antennas of a transmission apparatus according to a request of a switching of a transmission antenna of a receiving apparatus in a TSD system, and switch a currently used antenna into the selected transmission antenna.

According to an aspect of the present invention, there is provided a transmission apparatus, including: an announcement command frame reading unit to verify a Transmission Switched Diversity Information Element (TSD IE) included in an announcement command frame when receiving the announcement command frame from a receiving apparatus, and to verify whether to request a switching of the transmission antenna; an antenna switching unit to select an antenna, not being selected from among a plurality of antennas, as a transmission antenna when the announcement command frame requests the switching of the transmission antenna, and to switch a currently used antenna into the selected transmission antenna; and an announcement command frame generation unit to convert transmission antenna information included in the TSD IE into the selected transmission antenna, and to generate a response announcement command frame including the converted TSD IE and transmit the generated response announcement command frame to the receiving apparatus.

According to another aspect of the present invention, there is provided a receiving apparatus, including: a channel estimation unit to estimate a Link Quality Indication (LQI) by using a data frame received from a transmission apparatus; a switching determination unit to determine a switching of a transmission antenna when the LQI is lower than a predetermined threshold value; an announcement command frame generation unit to set a TSD IE to request a switching of a transmission antenna when the switching of the transmission antenna is determined, and to generate an announcement command frame including the TSD IE to transmit the generated announcement command frame to the transmission apparatus; and an announcement command frame reading unit to verify the transmission antenna switched in a converted TSD IE when receiving a response announcement command frame including the converted TSD IE from the transmission apparatus.

According to still another aspect of the present invention, there is provided a method of switching a transmission antenna in a transmission apparatus, the method including: receiving an announcement command frame from a receiving apparatus; verifying a TSD IE included in the received announcement command frame to verify whether to request a switching of the transmission antenna; selecting an antenna, not being selected from among a plurality of antennas, as a transmission antenna when the received announcement command frame requests the switching of the transmission antenna; converting transmission antenna information included in the TSD IE into the selected transmission antenna; generating a response announcement command frame including the converted TSD IE, and transmitting the generated response announcement command frame to the receiving apparatus; and switching a currently used antenna into the selected transmission antenna.

According to yet another aspect of the present invention, there is provided a method of switching a transmission antenna of a transmission apparatus in a receiving apparatus, the method including: estimating an LQI using a data frame received from the transmission apparatus; determining a switching of the transmission antenna when the LQI is lower than a predetermined value; setting a TSD IE to request a switching of a transmission antenna when the switching of the transmission antenna is determined; generating an announcement command frame including the TSD IE to transmit the generated announcement command frame to the transmission apparatus; receiving a response announcement command frame including a converted TSD IE from the transmission apparatus; and verifying the transmission antenna switched in the converted TSD IE.

EFFECT

According to embodiments of the present invention, there may be provided a transmission/receiving apparatus and method, in which a receiving apparatus of a Transmission Switched Diversity (TSD) system may measure a Link Quality Indication (LQI), and request a transmission apparatus for a switching of a transmission antenna when the LQI is less than a threshold value. Next, the transmission apparatus receiving the request for the switching of the transmission antenna may switch a currently used antenna into the transmission antenna, to thereby transmit data to the receiving apparatus via the transmission antenna having an LQI being greater than or equal to the threshold value. Through this, it is possible to provide a multiplexing gain due to the switching of the transmission antenna having a relatively low complexity, and to improve a frequency efficiency due to the multiplexing gain.

BRIEF DESCRIPTION OF THE DRAWINGS

These and/or other aspects will become apparent and more readily appreciated from the following description of exemplary embodiments, taken in conjunction with the accompanying drawings of which:

FIG. 2 is a diagram illustrating a format of a capability Information Element (IE) including information about whether to support a Transmission Switched Diversity IE (TSD IE) according to exemplary embodiments;

FIG. 3 is a diagram illustrating a structure of a TSD IE according to exemplary embodiments;

DETAILED DESCRIPTION

Figure 1:
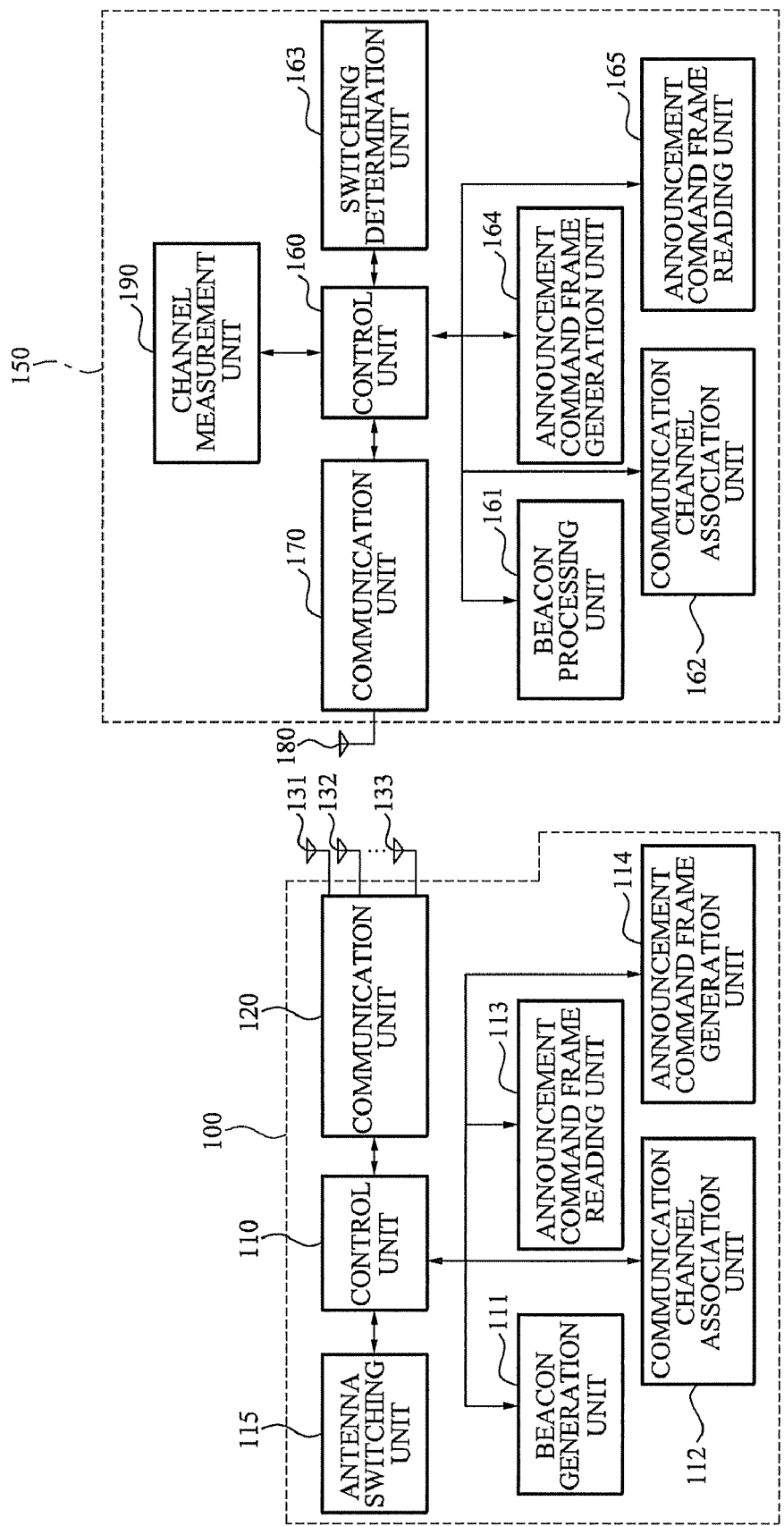
FIG. 1 is a diagram illustrating a configuration of a transmission apparatus and of a receiving apparatus in a Transmission Switched Diversity (TSD) system according to exemplary embodiments.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, exemplary embodiments will be described in detail with reference to the accompanying drawings. When it is determined the detailed description related to a known function or configuration may render the purpose of the present invention unnecessarily ambiguous in describing the present invention, the detailed description will be omitted here.

Exemplary embodiments of the present invention relate to a transmission/receiving apparatus and method in a Transmission Switched Diversity (TSD) system, that may select a transmission antenna from among a plurality of antennas of a transmission apparatus according to a request for a switching of a transmission antenna in a receiving apparatus, and switch a currently used antenna into the selected transmission antenna.

FIG. 1 is a diagram illustrating a configuration of a transmission apparatus 100 and of a receiving apparatus 150 in a TSD system according to exemplary embodiments. Referring to FIG. 1, the TSD system according to an exemplary embodiment of the present invention may include a transmission apparatus 100 and the receiving apparatus 150.

The transmission apparatus 100 includes a control unit 110, a beacon generation unit 111, a communication channel association unit 112, an announcement command frame reading unit 113, an announcement command frame generation unit 114, an antenna switching unit 115, a communication unit 120, and a plurality of antennas 131, 132, and 133.

The communication unit 120 may frequency-down convert a radio frequency signal received via the plurality of antennas 131, 132, and 133 when receiving data, and perform a dispreading and channel decoding on the received signal. Also, the communication unit 120 may perform a channel coding and spreading on data when transmitting data, and frequency-up convert the radio frequency signal to transmit the data via an antenna selected, by the antenna switching unit 115, from among the plurality of antennas 131, 132, and 133.

The beacon generation unit 111 may generate and transmit a beacon including a capability Information Element (IE). In this instance, the capability IE may include a Transmission Switched Diversity (TSD) support indicating whether the transmission apparatus 100 supports a Transmission Switched Diversity Information Element (TSD IE). The capability IE may be configured as illustrated in FIG. 2.

FIG. 2 is a diagram illustrating a format of a capability IE 200 including information about whether to support a TSD IE according to exemplary embodiments. Referring to FIG. 2, the capability IE 200 may include a TSD support 210[I recommend removing brackets used in FIG. 2, i.e. "(210)"->"210"] indicating whether to support the TSD IE in b36, that is, a 37-th bit. That is, when the transmission apparatus 100 supports a TSD, the TSD support 210 may have a value of '1', and when the transmission apparatus 100 does not support the TSD, the TSD support 210 may have a value of '0'.

The communication channel association unit 112 may perform a communication channel association between the transmission apparatus 100 and the receiving apparatus 150. The communication channel may be performed such that, when the transmission apparatus 100 receives an association request command frame from the receiving apparatus 150 receiving the beacon, the transmission apparatus 100 transmits an association response command frame to the receiving apparatus 150. A communication connection used in the communication association unit 112 may use a standard specification.

Prior to describing the announcement command frame reading unit 113 and the announcement command frame generation unit 114, a TSD IE included in the announcement command frame will be described in detail with reference to FIG. 3.

FIG. 3 is a diagram illustrating a structure of a TSD IE 300 according to exemplary embodiments. Referring to FIG. 3, the TSD IE 300 includes a transmission direction index 310, a TSD feedback period 320, a number of transmission directions 330, a mode 340, a length 350, and an element identifier (ID) 360.

The transmission direction index 310 may indicate the transmission antenna or an index of a transmission direction, selected by the transmission apparatus 100. The TSD feedback period 320 may indicate a predetermined period of time in which the receiving apparatus 150 transmits the TSD IE 300 to the transmission apparatus 100. The number of transmission directions 330 may indicate a number of the transmission antennas or a number of transmission directions, supported by the transmission apparatus 100 or the receiving apparatus 150. The length 350 may indicate a payload length of the IE, and expressed by an octet unit. The element ID 360 may indicate a type of the IE. The mode 340 may be information for verifying an operation of the announcement command frame including the TSD IE 300, and may be set as illustrated in <Table 1> below.

TABLE 1

| Field value | Mode | Description |
|---|---|---|
| 0 | Announce | Announce TSD IE sent from transmission apparatus to receiving apparatus |
| 1 | Request to switch | Receiving apparatus requests transmission apparatus to switch to the next transmission direction |
| 2 | Request to stay | Receiving apparatus requests transmission apparatus to stay at current transmission direction |
| 3 | Response | In response of a request |
| 4-255 | Reserved | |

Referring to <Table 1>, '0' of the value of the mode 340 may be used when the transmission apparatus 100 notifies a feedback request time to the receiving apparatus 150. '1' of the value of the mode 340 may be used when the receiving apparatus 150 requests the transmission apparatus 150 for the switching of the transmission antenna. '2' of the value of the mode 340 may be used when the receiving apparatus 150 requests the transmission apparatus 150 to hold a currently used transmission antenna. '3' of a value of the mode 340 may be used as a response to the request of the receiving apparatus.

The announcement command frame reading unit 113 may read an announcement command frame received from the receiving apparatus 150. The announcement command frame reading unit 113 may request a switching of a transmission antenna to the antenna switching unit 115 when the received announcement command frame is an announcement command frame that may request the switching of the transmission antenna based on the read result. That is, the announcement command frame reading unit 113 may read the received announcement command frame as the announcement command frame requesting the switching of the transmission antenna when the mode 340 of the TSD IE 300 included in the received announcement command frame has the value of '1'.

The announcement command frame reading unit 113 may receive a periodic announcement command frame indicating whether a disorder of a Link Quality Indication (LQI) exists to verify the disorder of the LQI or an error of the receiving apparatus 150. In this instance, the periodic announcement command frame may have a value of '2' as the value of the mode 340 of the TSD IE 300.

The antenna switching unit 150 may select, as the transmission antenna, an antenna that is not selected from among the plurality of antennas 131, 132, and 133, when receiving, from the announcement command frame reading unit 113, a request for the switching of the transmission antenna, and switch a currently used antenna into the selected transmission antenna.

The announcement command frame generation unit 114 may generate a response announcement command frame including information about the antenna selected in the antenna switching unit 115 when receiving, from the receiving apparatus 150, the announcement command frame requesting the switching of the transmission antenna. In this instance, the announcement command frame generation unit 114 may set the value of the mode 340 of the TSD IE 300 included in the response announcement command frame to indicate the response announcement command frame.

The announcement command frame generation unit 114 may generate the response announcement command frame including a currently used TSD IE 300 when receiving the periodic announcement command frame from the receiving apparatus 150, and transmit the generated response announcement command frame to the receiving apparatus 150. In this instance, the announcement command frame generation unit 114 may set the value of the mode 340 of the TSD IE 300 included in the response announcement command frame as '3' to indicate the response announcement command frame.

Also, the announcement command frame generation unit 114 may generate a notification announcement command frame including a TSD feedback period 320 to transmit the generated notification announcement command frame to the receiving apparatus 150, when intending to receive the announcement command frame in a predetermined period of time from the receiving apparatus 150. In this instance, the announcement command frame generation unit 114 may set the mode 340 of the TSD IE 300 included in the response announcement command frame as '0' to indicate the notification announcement command frame.

The control unit 110 may control general operations of the transmission apparatus 100 in the TSD system, and control the beacon generation unit 111, the communication channel association unit 112, the announcement command frame reading unit 113, the announcement command frame generation unit 114, and the antenna switching unit 115. That is, the control unit 110 may perform functions of the beacon generation unit 111, the communication channel association unit 112, the announcement command frame reading unit 113, the announcement command frame generation unit 114, and the antenna switching unit 115. According to embodiments of the present invention, the above-mentioned units controlled by the control unit 110 may be separately configured and illustrated to classify and describe the above mentioned functions. Accordingly, when embodying a product, all of the above-mentioned units may be configured to be controlled in the control unit 110, or only a part thereof may be configured to be controlled in the control unit 110.

The receiving apparatus 150 may include a control unit 160, a beacon processing unit 161, a communication channel association unit 162, a switching determination unit 163, an announcement command frame generation unit 164, an announcement command frame reading unit 165, a communication unit 170, an antenna 180, and a channel measurement unit 190.

The communication unit 170 may frequency-down convert a radio frequency signal received via the antenna 180 to perform a dispreading and channel decoding on the received radio frequency signal when receiving data, and perform a channel coding and spreading on the data to frequency-up convert the data, and transmit the data via the antenna 180, when transmitting the data.

The channel measurement unit 190 may measure a Link Quality Indication (LQI) using a data frame received through the communication unit 170.

When the beacon processing unit 161 receives a beacon including the capability IE 200, existence of the transmission apparatus 100 may be perceptible in a periphery of the receiving apparatus 150. The beacon processing unit 161 may verify the TSD support 210 included in the capability IE 200 to verify whether the transmission apparatus 100 transmitting the beacon supports the TSD IE.

The communication channel association unit 162 may perform a communication channel association when the beacon processing unit 161 receives the beacon. In this instance, the communication channel association may be performed such that the receiving apparatus 150 receiving the beacon transmits an association request command frame to the transmission apparatus 100, and receives an association response command frame from the transmission apparatus 100. A communication channel association used in the communication channel association unit 162 may use a standard specification.

The switching determination unit 163 may compare the LQI measured using the channel measurement 190 with a predetermined threshold value to determine a switching of the transmission antenna. That is, when the LQI is lower than the predetermined threshold value, the switching determination unit 163 may determine the transmission antenna to be switched, and when the LQI is greater than or equal to the predetermined threshold value, the switching determination unit 163 may determine the transmission antenna not to be switched.

When the switching determination unit 163 determines the switching of the transmission antenna, the announcement command frame generation unit 164 may generate an announcement command frame requesting the switching of the transmission antenna, and transmit the generated announcement command frame to the transmission apparatus 100. In this instance, the announcement command frame generation unit 164 may set, as a value of '1', the mode 340 of the TSD IE 300 included in the announcement command frame to indicate the announcement command frame requesting the switching of the transmission antenna.

The announcement command frame generation unit 164 may generate a periodic announcement command frame in a predetermined period of time or in a period of time requested from the transmission apparatus 100 using the TSD feedback period 320 of the announcement command frame, and transmit the generated periodic announcement command frame to the transmission apparatus 100. The announcement command frame generation unit 164 may transmit the periodic announcement command frame to the transmission apparatus 100 in order to notify that a current LQI is normal and the receiving apparatus 150 is normally operated. In this instance, the announcement command frame generation unit 164 may set, as a value of '2', the mode 340 of the TSD IE 300 included in the periodic announcement command frame to indicate the periodic announcement command frame.

The announcement command frame reading unit 165 may read the announcement command frame including the TSD IE 300 received from the transmission apparatus 100. When the received announcement command frame is a response announcement command frame based on the read result, the announcement command frame reading unit 165 may verify the transmission direction index 310 of the TSD IE 300 included in the response announcement command frame. Next, when the transmission antenna is switched, the announcement command frame reading unit 165 may transmit information about the switched transmission antenna to the communication unit 170. In this instance, when the mode 340 of the TSD IE 300 included in the received announcement command frame has a value of '3', the announcement command frame reading unit 165 may read the mode 340 as the response announcement command frame.

When the received announcement command frame is the notification announcement command frame, the announcement command frame reading unit 165 may verify the TSD feedback period 320 of the TSD IE 300 included in the notification announcement command frame to verify a predetermined period of time, and transmit the verified information to the announcement command frame generation unit 320. In this instance, when the mode 340 of the TSD IE 300 included in the received announcement command frame has a value of '0', the announcement command frame reading unit 165 may read the mode 340 as the notification announcement command frame.

The control unit 160 may control general operations of the receiving apparatus 150 of the TSD system, and control the beacon processing unit 161, the communication channel association unit 162, the switching determination unit 163, the announcement command frame generation unit 164, and the announcement command frame reading unit 165. That is, the control unit 160 may perform functions of the beacon generation unit 161, the communication channel association unit 162, the announcement command frame reading unit 165, the announcement command frame generation unit 164, and the antenna switching unit 163. According to embodiments of the present invention, the above-mentioned units controlled by the control unit 160 may be separately configured and illustrated to classify and describe the above mentioned functions. Accordingly, when embodying a product, all of the above mentioned units may be configured to be controlled in the control unit 160, or only a part thereof may be configured to be controlled in the control unit 160.

A method of switching the transmission antenna in the above described TSD system according to embodiments of the present invention will be hereinafter described in detail with reference to drawings.

Figure 4:
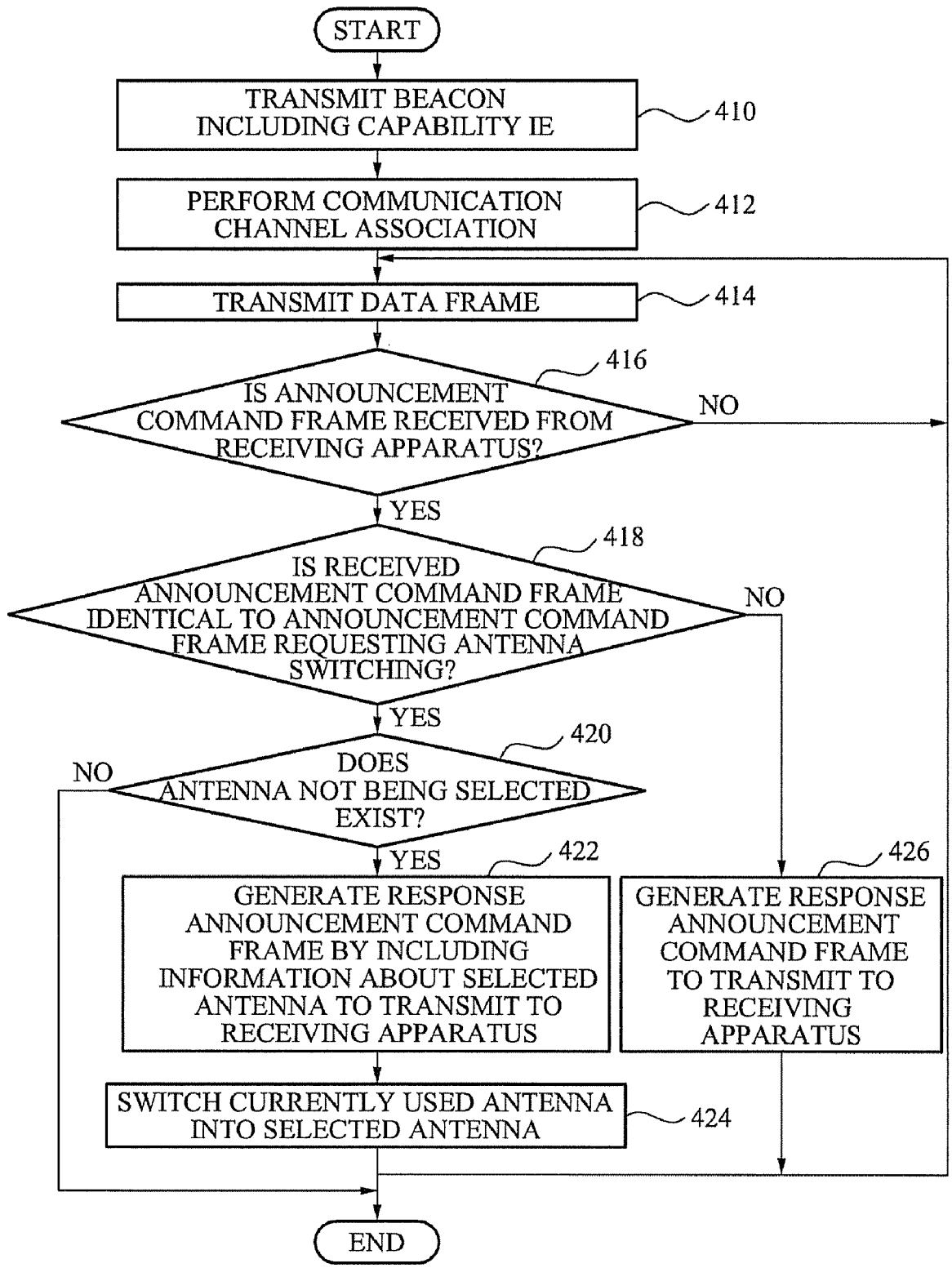
FIG. 4 is a flowchart illustrating a process of switching a transmission antenna in a transmission apparatus of a TSD system according to exemplary embodiments.

FIG. 4 is a flowchart illustrating a process of switching a transmission antenna in a transmission apparatus of a TSD system according to exemplary embodiments. Referring to FIG. 4, in operation 410, the transmission apparatus 100 may transmit a beacon including the capability IE 200. In this instance, the capability IE 200 may include the TSD support 210 indicating whether the transmission apparatus 100 supports the TSD IE.

In operation 412, the transmission apparatus 100 may perform a communication channel association. The communication channel association may be performed such that the transmission apparatus 100 receives an association request command frame from the receiving apparatus 150 receiving the beacon, and transmits an association response command frame to the receiving apparatus 150.

Next, in operation 414, the transmission apparatus 100 may transmit a data frame to the receiving apparatus 150. In operation 416, the transmission apparatus 100 may verify that an announcement command frame is received from the receiving apparatus 150. In operation 416, when the announcement command frame is not received from the receiving apparatus 150 based on the verified result, the transmission apparatus 100 may return to operation 414, and transmit the data frame to the receiving apparatus 150.

However, when the announcement command frame is received from the receiving apparatus 150 based on the verified result, the transmission apparatus 100 may proceed to operation 418, and verify the TSD IE 300 included in the announcement command frame to verify whether the received announcement command frame is an announcement command frame requesting a switching of the transmission antenna. In this instance, the transmission apparatus 100 may verify, using the mode 340 included in the TSD IE 300, whether the received announcement command frame is the announcement command frame requesting the switching of the transmission antenna.

When the received announcement command frame is the announcement command frame requesting the switching of the transmission antenna based on the verified result of operation 418, the transmission apparatus 100 may proceed to operation 420, and verify whether an antenna, not being selected to be switched, exists.

When the antenna, not being selected to be switched, does not exist based on the verified result of operation 420, the transmission apparatus 100 may terminate the process of switching a transmission antenna in a transmission apparatus of a TSD system.

When the antenna, not being selected to be switched, exist based on the verified result of operation 420, the transmission apparatus 100 may proceed to operation 422, and select the antenna not being selected from among a plurality of antennas, generate a response announcement command frame including information about the selected antenna, and transmit the generated response announcement command frame to the receiving apparatus 150. In this instance, the transmission apparatus 100 may set, as a response, the mode 340 included in the TSD IE 300 to generate the response announcement command frame. Next, the transmission apparatus 100 may proceed to operation 424, and switch a currently used transmission antenna into the selected antenna to set the transmission antenna.

However, when the received announcement command frame is a periodic announcement command frame based on the verified result of operation 418, the transmission apparatus 100 may proceed to operation 426, and hold the currently used transmission antenna and generate the response announcement command frame including a currently used TSD IE 300 to transmit the generated response announcement command frame to the receiving apparatus. In this instance, the transmission apparatus 150 may set, as a response, the mode 340 included in the TSD IE 300 to generate the response announcement command frame.

The transmission apparatus 100 may return to operation 414 after operations 424 or 426 is terminated, and repeatedly perform a series of operations reaching operations 424 or 426.

Figure 5:
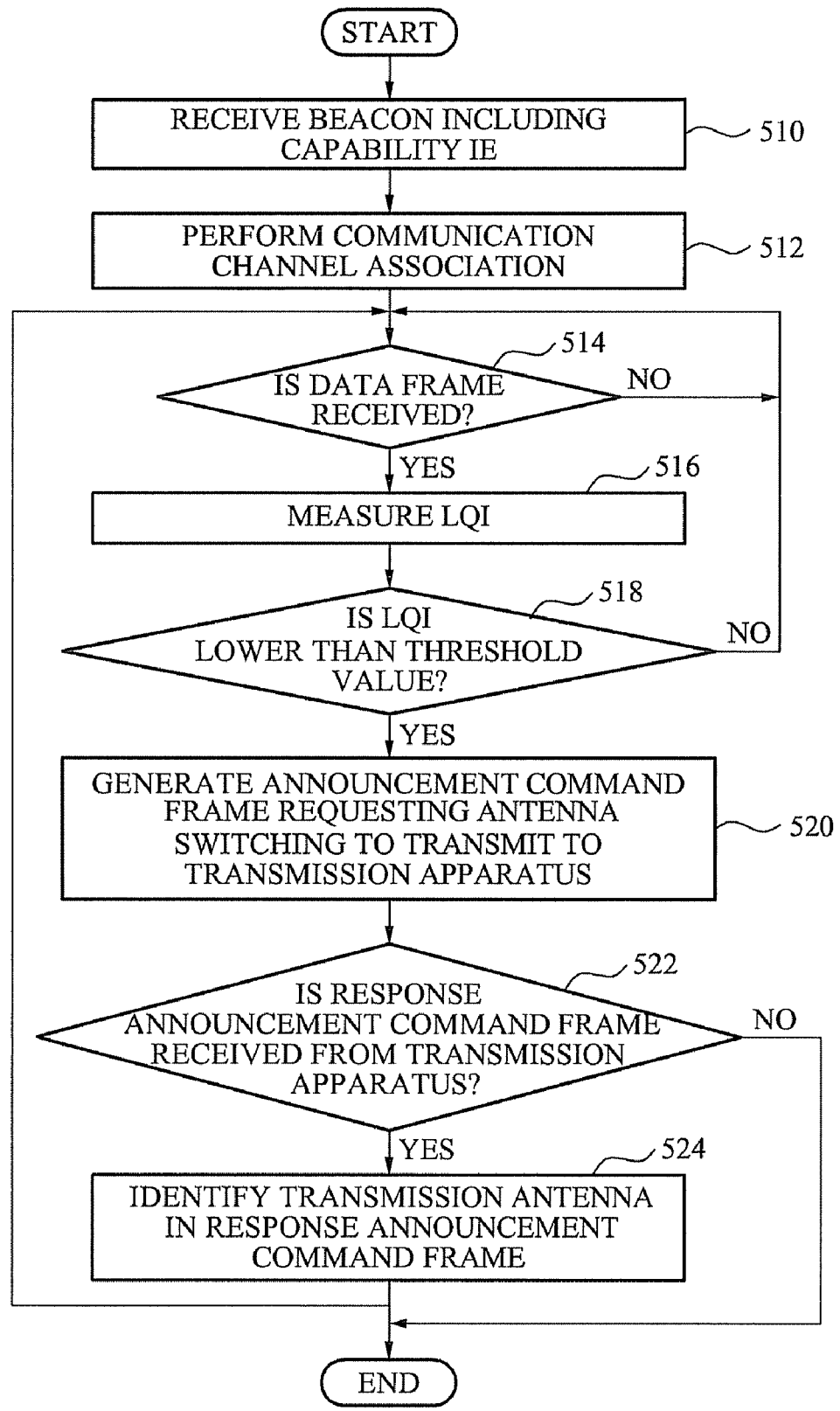
FIG. 5 is a flowchart illustrating a process of switching a transmission antenna in a receiving apparatus of a TSD system according to exemplary embodiments.

FIG. 5 is a flowchart illustrating a process of switching a transmission antenna in the receiving apparatus 150 of a TSD system according to exemplary embodiments. Referring to FIG. 5, the receiving apparatus 150 may receive a beacon including the capability IE 200. In this instance, the capability IE 200 may include the TSD support 210 indicating whether the transmission apparatus 100 supports the TSD IE.

In operation 512, the receiving apparatus 150 may perform a communication channel association. In this instance, the communication channel association may be performed such that the receiving apparatus 150 receiving the beacon transmits an association request command frame to the transmission apparatus 100, and receives an association response command frame from the transmission apparatus 100.

Next, when receiving a data frame in operation 514, the receiving apparatus 150 may proceed to operation 516, and measure an LQI. Next, in operation 518, the receiving apparatus 150 may verify whether the LQI is lower than a predetermined threshold value.

When the LQI is greater than or equal to the predetermined threshold value based on the verified result of operation 518, the receiving apparatus 150 may return to operation 514, and repeatedly receive the data frame.

When the LQI is lower than the predetermined threshold value based on the verified result of operation 518, the receiving apparatus 150 may proceed to operation 520, and generate the announcement command frame requesting a switching of the transmission antenna to transmit the generated announcement command frame to the transmission apparatus 100. In this instance, the transmission apparatus 100 may set, as a request of the switching of the transmission antenna, the mode 340 included in the TSD IE 300 to generate the announcement command frame requesting the switching of the transmission antenna.

In operation 522, the receiving apparatus 150 may verify whether a response announcement command frame is received from the transmission apparatus 100.

When the response announcement command frame is received based on the verified result of operation 522, the receiving apparatus 150 may proceed to operation 524, and identify the transmission antenna in the response announcement command frame. In this instance, the verification of the transmission antenna may be performed through the transmission direction index 310 included in the TSD IE 300.

Next, the receiving apparatus 150 may return to operation 514, and receive the data frame transmitted via the switched transmission antenna.

When the response announcement command frame is not received based on the verified result of operation 522, the receiving apparatus 150 may terminate the process of switching a transmission antenna in a receiving apparatus of a TSD system.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmission apparatus, comprising:
an announcement command frame reading unit to verify a Transmission Switched Diversity Information Element (TSD IE) included in an announcement command frame when receiving the announcement command frame from a receiving apparatus, and to verify whether to request a switching of the transmission antenna;
an antenna switching unit to select an antenna, not being selected from among a plurality of antennas, as a transmission antenna when the announcement command frame requests the switching of the transmission antenna, and to switch a currently used antenna into the selected transmission antenna; and
an announcement command frame generation unit to convert transmission antenna information included in the TSD IE into the selected transmission antenna, and to generate a response announcement command frame including the converted TSD IE and transmit the generated response announcement command frame to the receiving apparatus.

2. The transmission apparatus of claim 1, wherein the announcement command frame reading unit receives a periodic announcement command frame in a predetermined period of time to determine a disorder of a Link Quality Indication (LQI) or a malfunction of the receiving apparatus.

3. The transmission apparatus of claim 1, wherein the announcement command frame generation unit includes the TSD IE including a predetermined period of time, and generates a notification announcement command frame to transmit the generated notification announcement command frame to the receiving apparatus to receive the announcement command frame in the predetermined period of time from the receiving apparatus.

4. The transmission apparatus of claim 1, wherein the TSD IE includes at least one of a transmission direction index to indicate the transmission antenna selected in the transmission apparatus, a TSD feedback period to indicate a predetermined period of time in which the TSD IE is transmitted from the receiving apparatus to the transmission apparatus, a number of transmission directions to indicate a number of antennas or a number of transmission directions, supported by the transmission apparatus or the receiving apparatus, a length to indicate a length of a payload of the TSD IE, an element identifier (ID) to identify the TSD IE, and a mode to set an operation of the TSD IE.

5. The transmission apparatus of claim 4, wherein the mode is set as one of a notification mode notifying that the TSD feedback period is set in the transmission apparatus, a switching request mode requesting a switching of the transmission antenna, a hold request mode maintaining a current transmission antenna, and a response mode responding to a request.

6. The transmission apparatus of claim 1, further comprising:
a beacon generation unit to include a capability IE including a TSD support indicating whether to support a TSD to generate and transmit a beacon.

7. A receiving apparatus, comprising:
a channel estimation unit to estimate a Link Quality Indication (LQI) by using a data frame received from a transmission apparatus;
a switching determination unit to determine a switching of a transmission antenna when the LQI is lower than a predetermined threshold value to antenna, not being selected from among a plurality of antennas;
an announcement command frame generation unit to set a TSD IE to request a switching of a transmission antenna when the switching of the transmission antenna is determined, and to generate an announcement command frame including the TSD IE to transmit the generated announcement command frame to the transmission apparatus; and
an announcement command frame reading unit to verify the transmission antenna switched in a converted TSD IE when receiving a response announcement command frame including the converted TSD IE from the transmission apparatus.

8. The receiving apparatus of claim 7, wherein the announcement command frame generation unit sets the TSD IE to prevent requesting of the switching of the transmission antenna, and generates the announcement command frame including the TSD IE in a predetermined period of time to transmit the generated announcement command frame to the transmission apparatus.

9. The receiving apparatus of claim 7, wherein the TSD IE includes at least one of a transmission direction index to indicate the transmission antenna selected in the transmission apparatus, a TSD feedback period to indicate a predetermined period of time in which the TSD IE is transmitted from the receiving apparatus to the transmission apparatus, a number of transmission directions to indicate a number of antennas or a number of transmission directions, supported by the transmission apparatus or the receiving apparatus, a length to indicate a length of a payload of the TSD IE, an element identifier (ID) to identify the TSD IE, and a mode to set an operation of the TSD IE.

10. The receiving apparatus of claim 9, wherein the mode is set as one of a notification mode notifying that the TSD feedback period is set in the transmission apparatus, a switching request mode requesting a switching of the transmission antenna, a hold request mode maintaining a current transmission antenna, and a response mode responding to a request.

11. The receiving apparatus of claim 7, further comprising:
a beacon processing unit to verify a TSD support included in a capability IE to verify whether the transmission apparatus supports the TSD IE, when receiving a beacon including the capability IE.

12. A method of switching a transmission antenna in a transmission apparatus, the method comprising:
receiving an announcement command frame from a receiving apparatus;
verifying a TSD IE included in the received announcement command frame to verify whether to request a switching of the transmission antenna;
selecting an antenna, not being selected from among a plurality of antennas, as a transmission antenna when the received announcement command frame requests the switching of the transmission antenna;
converting transmission antenna information included in the TSD IE into the selected transmission antenna;
generating a response announcement command frame including the converted TSD IE, and transmitting the generated response announcement command frame to the receiving apparatus; and
switching a currently used antenna into the selected transmission antenna.

13. The method of claim 12, further comprising:
receiving a periodic announcement command frame in a predetermined period of time to determine a disorder of an LQI or a malfunction of the receiving apparatus.

14. The method of claim 12, further comprising:
including the TSD IE including a predetermined period of time, generating a notification announcement command frame to transmit the generated notification announcement command frame to the receiving apparatus to receive the announcement command frame in the predetermined period of time from the receiving apparatus.

15. The method of claim 12, wherein the TSD IE includes at least one of a transmission direction index to indicate the transmission antenna selected in the transmission apparatus, a TSD feedback period to indicate a predetermined period of time in which the TSD IE is transmitted from the receiving apparatus to the transmission apparatus, a number of transmission directions to indicate a number of antennas or a number of transmission directions, supported by the transmission apparatus or the receiving apparatus, a length to indicate a length of a payload of the TSD IE, an element identifier (ID) to identify the TSD IE, and a mode to set an operation of the TSD IE, wherein
the mode is set as one of a notification mode notifying that TSD feedback period is set in the transmission apparatus, a switching request mode requesting a switching of the transmission antenna, a hold request mode maintaining a current transmission antenna, and a response mode responding to a request.

16. The method of claim 12, further comprising:
including a capability IE including a TSD support indicating whether to support a TSD IE to generate a beacon before receiving the announcement command frame from the receiving apparatus; and
transmitting the generated beacon.

17. A method of switching a transmission antenna of a transmission apparatus in a receiving apparatus, the method comprising:
estimating an LQI using a data frame received from the transmission apparatus;
determining a switching of the transmission antenna when the LQI is lower than a predetermined value to antenna, not being selected from among a plurality of antennas;
setting a TSD IE to request a switching of a transmission antenna when the switching of the transmission antenna is determined;

generating an announcement command frame including the TSD IE to transmit the generated announcement command frame to the transmission apparatus;

receiving a response announcement command frame including a converted TSD IE from the transmission apparatus; and verifying the transmission antenna switched in the converted TSD IE.

18. The method of claim 17, further comprising:

setting the TSD IE to prevent requesting of the switching of the transmission antenna, and generating the announcement command frame including the TSD IE in a predetermined period of time to transmit the generated announcement command frame to the transmission apparatus.

19. The method of claim 17, wherein the TSD IE includes at least one of a transmission direction index to indicate the transmission antenna selected in the transmission apparatus, a TSD feedback period to indicate a predetermined period of time in which the TSD IE is transmitted from the receiving apparatus to the transmission apparatus, a number of transmission directions to indicate a number of antennas or a number of transmission directions, supported by the transmission apparatus or the receiving apparatus, a length to indicate a length of a payload of the TSD IE, an element identifier (ID) to identify the TSD IE, and a mode to set an operation of the TSD IE, wherein the mode is set as one of a notification mode notifying that the TSD feedback period is set in the transmission apparatus, a switching request mode requesting a switching of the transmission antenna, a hold request mode maintaining a current transmission antenna, and a response mode responding to a request.

20. The method of claim 17, further comprising:

receiving a beacon including a capability IE; and verifying a TSD support included in the capability IE to verify whether the transmission apparatus supports a TSD.

* * * * *